United States Patent [19]
Kinoshita et al.

[11] Patent Number: 5,574,442
[45] Date of Patent: Nov. 12, 1996

[54] INCLINATION ANGLE SENSOR

[75] Inventors: Motohiro Kinoshita; Fumitoshi Masuda; Masanori Oshima; Hiromu Okunishi; Kiminori Yamauchi, all of Kyoto, Japan

[73] Assignee: Murata Manufacturing Co., Ltd., Japan

[21] Appl. No.: 273,395

[22] Filed: Jul. 11, 1994

[30] Foreign Application Priority Data

Jul. 12, 1993 [JP] Japan ................................. 5-195518

[51] Int. Cl.$^6$ ................................................. G08C 15/00
[52] U.S. Cl. ........................... 340/870.38; 340/870.37; 324/658; 324/659; 33/391; 33/366
[58] Field of Search ............................ 324/658, 659, 324/660, 661; 33/366, 391, 1 PT, 534; 340/686, 689, 870.38, 870.37

[56] References Cited

U.S. PATENT DOCUMENTS

| | | | |
|---|---|---|---|
| 3,668,672 | 6/1972 | Parnell | 324/660 |
| 4,667,413 | 5/1987 | Pitts | 33/366 |
| 4,703,315 | 10/1987 | Bein et al. | 33/366 |
| 4,912,662 | 3/1990 | Butler et al. | 33/366 |
| 5,028,875 | 7/1991 | Peters | 324/660 |
| 5,083,383 | 1/1992 | Heger | 33/366 |
| 5,261,279 | 11/1993 | Wolf et al. | 33/366 |

FOREIGN PATENT DOCUMENTS

| | | |
|---|---|---|
| 3711062 | 4/1987 | Germany . |
| 253670 | 1/1988 | Germany . |
| 3637529 | 3/1988 | Germany . |
| 55-88109 | 6/1980 | Japan . |

*Primary Examiner*—Jeffery Hofsass
*Assistant Examiner*—Ashok Mannava
*Attorney, Agent, or Firm*—Ostrolenk, Faber, Gerb & Soffen, LLP

[57] ABSTRACT

First and second fixed electrodes are fixedly provided on a housing which is mounted on a surface whose inclination angle is to be detected. A rotatable electrode is inserted between these fixed electrodes, and this rotatable electrode is mounted on a shaft which is rotatably provided on the housing. The rotatable electrode is made to regularly face a constant direction with respect to the gravitational direction. The first fixed electrode has a central angle of 180°, for example, and is split into a first fixed split electrode member having a central angle of 60° and a second fixed split electrode member having a central angle of 120°. Wires are connected to the fixed split electrode members respectively, thereby taking out two series-connected capacitances which are formed by the respective ones of the first and second fixed split electrode members and the rotatable electrode. The second fixed electrode is structured similarly to the first fixed electrode. Thus, it is possible to detect the inclination angle of the surface to be measured on the basis of the capacitances.

23 Claims, 3 Drawing Sheets

INCLINATION ANGLE SENSOR

BACKGROUND OF THE INVENTION

1. Field of the Invention

The present invention relates to an inclination angle sensor, and more particularly, it relates to an inclination angle sensor for detecting an inclination angle from an amount of change of a capacitance.

2. Description of the Related Art

The present invention is directed to an inclination angle sensor, which belongs to a field adjacent to that including a rotation angle sensor. In relation to such a rotation angle sensor, a capacitance type rotation angle sensor which is of interest to the present invention is described in Japanese Utility Model Laying-Open No. 55-88109 (1980), for example.

This rotation angle sensor comprises a plurality of fixed electrodes and a plurality of rotatable electrodes which are positioned between the fixed electrodes, and the rotatable electrodes are mounted on a shaft which is rotatably supported. Respective shapes of the fixed and rotatable electrodes are so selected that overlap areas thereof are varied with change of the rotation angle of the shaft. The shaft is rotated in correspondence to the rotation angle to be detected. Thus, the overlap areas of the fixed and rotatable electrodes are varied in correspondence to the rotation angle to be detected, whereby a capacitance which is formed by these electrodes is changed. This capacitance is taken out by a first terminal which is electrically connected with the fixed electrodes and a second terminal which is electrically connected with the rotatable electrodes. Thus, it is possible to recognize the rotation angle to be detected by change of the capacitance.

The aforementioned electrical connection between the fixed electrodes and the first terminal can be readily attained through a conductive member which is directly mounted on the fixed electrodes. On the other hand, the electrical connection between the rotatable electrodes and the second terminal is attained through a collector or a brush being slidably in contact with the shaft for allowing rotation of the rotatable electrodes, which shaft is made of a conductive material. With respect to rotation of the rotatable electrodes and the shaft, therefore, frictional resistance is caused by the collector or the brush to an unignorable degree.

In order to apply the structure of the aforementioned rotation angle sensor to an inclination angle sensor, therefore, it is necessary to solve the problem of frictional resistance. When the aforementioned rotation angle sensor is employed as an inclination angle sensor, the rotatable electrodes are movably supported so as to regularly face a constant direction with respect to the gravitational direction. However, the gravitational force for making the rotatable electrodes face the constant direction with respect to the gravitational direction is relatively small since the same is substantially provided merely by the gravitational force of the rotatable electrodes themselves. When rotation of the shaft is influenced by the frictional resistance caused by the collector or the brush as described above, therefore, the rotatable electrodes may not correctly face the constant direction with respect to the gravitational direction. Further, such friction may cause wear on the sliding contact portion, resulting in an inferior electrical contact, and hence the life of a sensor depends on the life of the collector or brush. As the result, such an inclination angle sensor deteriorates in reliability with respect to accuracy in measurement of the inclination angle.

SUMMARY OF THE INVENTION

Accordingly, an object of the present invention is to provide an inclination angle sensor which can solve the aforementioned problem.

An inclination angle sensor according to the present invention comprises a housing which is in an inclined state correlative to an inclination angle to be detected, fixed electrode means which is fixedly provided on the housing, and rotatable electrode means which is provided on the housing to be rotatable about a prescribed rotation axis at a prescribed space from the fixed electrode means and made to face a constant direction with respect to the gravitational direction. The fixed electrode means comprises first and second fixed split electrode members which are split through a parting line radially extending from the rotation axis of the rotatable electrode means, not to conduct with each other. The first and second fixed split electrode members have central angles of not more than 180° in total respectively. On the other hand, the rotatable electrode means has a central angle which is not more than the total central angle of the first and second fixed split electrode members. The inventive inclination angle sensor further comprises conductive means which is electrically connected with the respective ones of the first and second fixed split electrode members, in order to take out a capacitance formed between the fixed electrode means and the rotatable electrode means.

According to the present invention, the housing is mounted on an object whose inclination angle is to be detected. The fixed electrode means, which is fixedly provided on the housing, enters an inclined state corresponding to the inclination angle to be detected. On the other hand, the movable electrode means is made to regularly face a constant direction with respect to the gravitational direction regardless of the inclined state of the housing. In this state, the conductive means which is electrically connected with the respective ones of the first and second fixed split electrode members takes out the capacitance which is formed between the fixed electrode means and the rotatable electrode means. In more concrete terms, this capacitance is obtained by connecting two capacitances which are formed between the respective ones of the first and second fixed split electrode members and the rotatable electrode means in series with each other through the rotatable electrode means. Thus, the capacitance which is formed between the fixed electrode means and the rotatable electrode means is varied with change of overlap areas of the first and second fixed split electrode members and the rotatable electrode means caused by change of the inclination angle to be detected. Therefore, it is possible to recognize the inclination angle to be detected on the basis of this capacitance.

According to the present invention, the capacitance which is formed between the fixed electrode means and the rotatable electrode means can be taken out from the conductive means which is electrically connected with the respective ones of the first and second fixed split electrode members provided on the fixed side, whereby it is not necessary to use the aforementioned collector or brush. Thus, no influence is exerted on rotation of the rotatable electrode means by frictional force caused by such a collector or brush. Consequently, the rotatable electrode means can be so smoothly rotated that it is possible to improve reliability with respect to accuracy in detection of the inclination angle.

According to the present invention, further, no sliding portion of a collector or a brush is required, whereby electrically connected portions can be stabilized and increased in life.

According to the present invention, further, the respective central angles of the first and second fixed split electrode members are set to be not more than 180° in total while the central angle of the rotatable electrode means is set to be not more than the total central angle of the first and second fixed split electrode members, whereby the inclination angle sensor can be miniaturized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
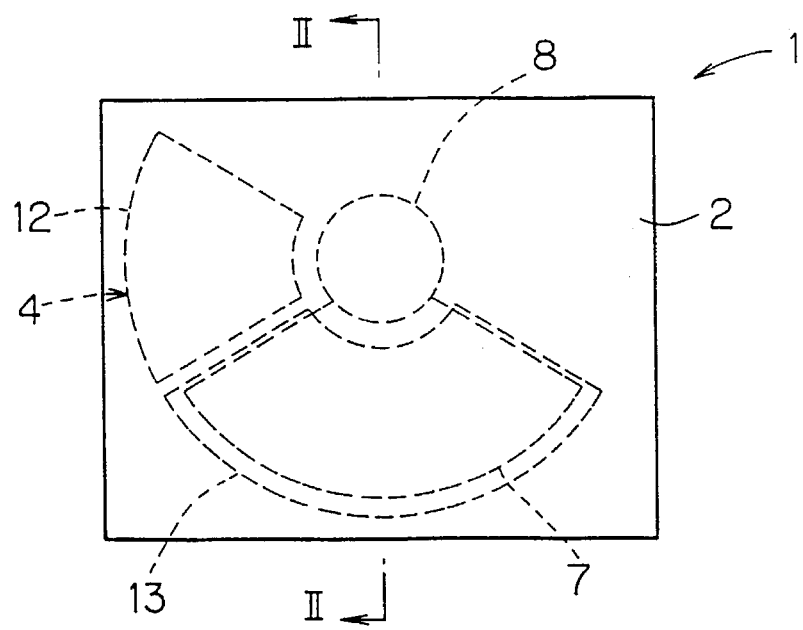
FIG. 1 is a front elevational view showing an inclination angle sensor according to an embodiment of the present invention.
Figure 2:
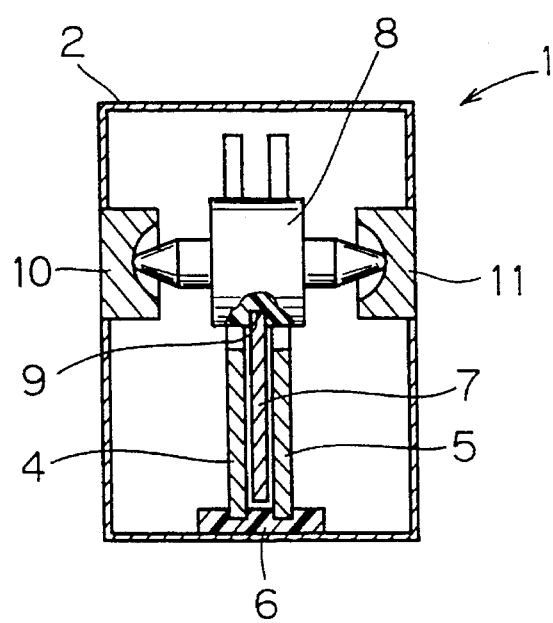
FIG. 2 is a sectional view taken along the line II—II in FIG. 1.
Figure 5:
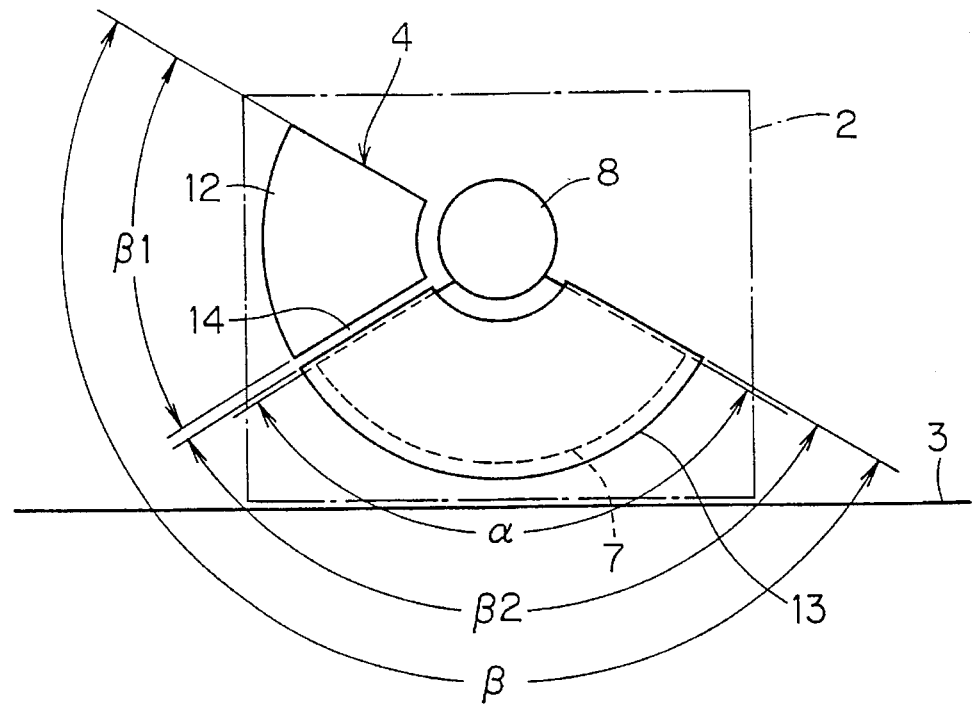
FIG. 5 is a front elevational view showing the positional relation between fixed electrode means and rotatable electrode means which are included in the inclination angle sensor shown in FIG. 1, in such a state that an inclination angle to be detected is 0°.
Figure 6:
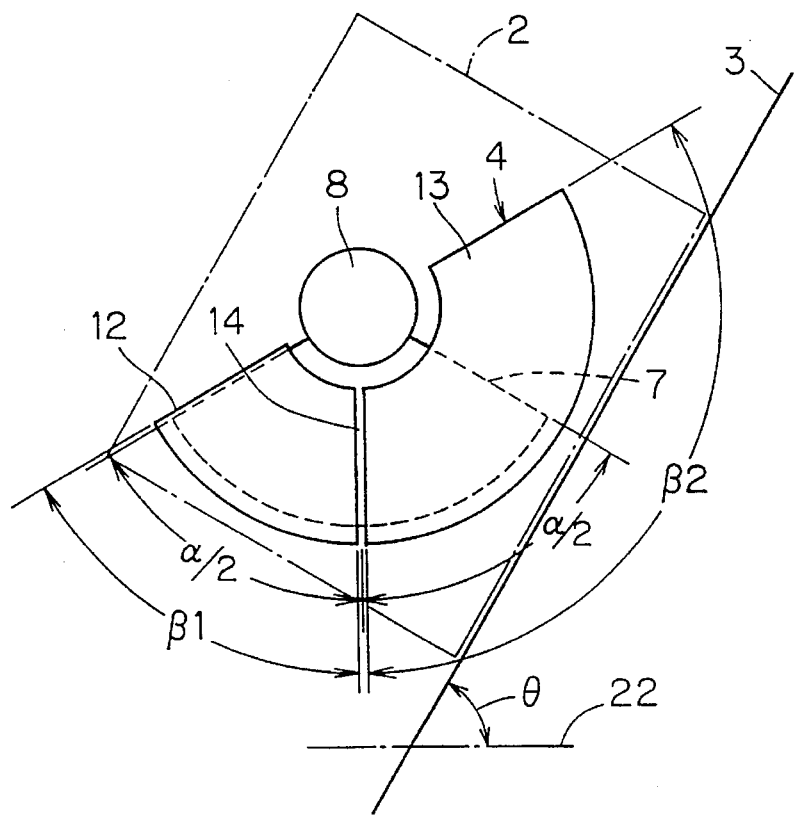
FIG. 6 is a front elevational view corresponding to FIG. 5, in such a state that an inclination angle to be detected is 8.

As shown in FIGS. 1 and 2, an inclination angle sensor 1 comprises a housing 2, which stores elements as hereafter described. As shown in FIGS. 5 and 6, the housing 2 is mounted on a surface 3 whose inclination angle is to be measured, thereby entering an inclined state which is correlative to the inclination angle to be detected. The housing 2 is preferably made of a conductive material such as a metal, and earth-connected. Thus, the housing 2 is prevented from an influence exerted by a capacitance which may stray in the exterior of the housing 2.

In the housing 2, first and second fixed electrodes 4 and 5 are arranged in parallel with each other at a prescribed space. The space between the first and second fixed electrodes 4 and 5 is maintained by a spacer 6. The space between the first and second fixed electrodes 4 and 5 may be adjusted by changing the spacer 6.

A rotatable electrode 7 is arranged at prescribed spacing with respect to the first and second fixed electrodes 4 and 5 respectively. The rotatable electrode 7 is partially engaged in a groove 9 which is provided on a peripheral surface of a shaft 8, to be fixed to the shaft 8. The rotatable electrode 7 is directed in parallel with the first and second fixed electrodes 4 and 5 respectively, and perpendicularly to the central axis of the shaft 8. The shaft 8 is held on both end portions thereof by bearings 10 and 11 which are mounted on the housing 2, to be rotatable about a prescribed rotation axis with respect to the housing 2. The bearings 10 and 11 are preferably formed by pivot bearings which can be small-sized and supply smooth rotation to the shaft 8 with small torque. The rotatable electrode 7 is caused by its own gravitational force (weight) to regularly face a constant direction with respect to the gravitational direction.

The shaft 8 may be provided by molding resin, and the rotatable electrode 7 may be integrated with the rotatable electrode 8 by insertion in such molding. Alternatively, the rotatable electrode 7 may be made of a conductive metal plated on such molding after the rotatable electrode 7 and the shaft 8 are integrally formed by resin molding. The fixed electrodes 4 and 5 may also be made of a metal-plated insulating material such as resin.

Figure 3:
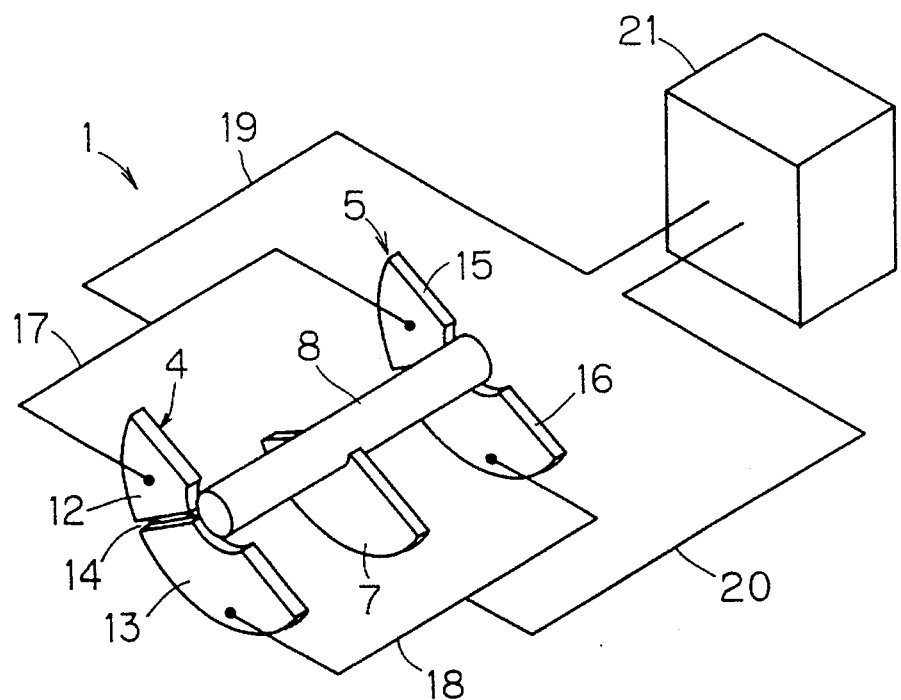
FIG. 3 is a perspective view illustrating a principal part of the inclination angle sensor shown in FIG. 1.

FIG. 3 shows the shaft 8 in an exaggerated length. As shown in FIGS. 3, 5 and 6, the first fixed electrode 4 comprises first and second fixed split electrode members 12 and 13, which are split so as not to conduct with each other. The first and second fixed split electrode members 12 and 13 are split by a parting line 14 radially extending from the rotation axis of the rotatable electrode 7, i.e., the central axis of the shaft 8. Similarly, the second fixed electrode 5 is also split into first and second fixed split electrode members 15 and 16. According to this embodiment, the fixed split electrode members 12, 13, 15 and 16 and the rotatable electrode 7 are substantially in the form of sectors respectively.

FIG. 3 shows wiring provided in this inclination angle sensor 1. As shown in FIG. 3, the first fixed split electrodes 12 and 15 are electrically connected with each other by a wire 17, and the second fixed split electrode members 13 and 16 are also electrically connected with each other by a wire 18. These wires 17 and 18 are connected with wires 19 and 20 respectively. Thus, a capacitance formed by the first fixed electrode 4 and the rotatable electrode 7 is connected in parallel with that formed by the second fixed electrode 5 and the rotatable electrode 7 by the wires 17 and 18, so that the total parallel-connected capacitance is taken out by the wires 19 and 20. The wires 19 and 20 are connected to conversion means 21, which in turn converts the capacitance to another electric signal. The conversion means 21 converts the capacitance to a voltage, a frequency, a pulse width or a current, for example.

The first and second fixed electrodes 4 and 5 are substantially identical in structure to each other. Thus, description on the first fixed electrode 4 is also applicable to the second fixed electrode 5. The first fixed electrode 4 is now described.

As shown in FIGS. 5 and 6, the first and second fixed split electrode members 12 and 13 have central angles $\beta 1$ and $\beta 2$ respectively. The total central angle $\beta$ of these central angles $\beta 1$ and $\beta 2$ is selected to be not more than 180°. While a small clearance is defined between the first and second fixed split electrode members 12 and 13, the size of this clearance is ignored and it is assumed that $\beta 1+\beta 2=\beta$ in the following description. On the other hand, a central angle $\alpha$ of the rotatable electrode 7 is rendered not more than the total central angle $\beta$.

More preferably, the central angles $\beta 1$ and $\beta 2$ are made to differ from each other. Particularly in the embodiment shown in the drawings, the ratio of the central angle $\beta 1$ to the central angle $\beta 2$ is selected at 1:2. Further, the central angle $\beta$ is set at a value of ⅔ the total central angle $\beta$, and doubled the valve of with the smaller one $\beta 1$ of the central angles $\beta 1$ and $\beta 2$. In addition, the central angle $\beta 1$ is half the central angle α, while the central angle β2 is equal to the central angle α. When such conditions are satisfied, it is possible to further the increase difference between maximum and minimum values of the capacitance which is formed by the fixed electrode 4 and the rotatable electrode 7 effectively through areas of the fixed electrode 4 and the rotatable electrode 7 respectively, as clearly understood from the following description.

The capacitance formed by the fixed electrode 4 and the rotatable electrode 7 is obtained by connecting the capacitance which is formed by the first fixed split electrode member 12 and the rotatable electrode 7 and that formed by the second fixed split electrode member 13 and the rotatable electrode 7 in series with each other by the rotatable electrode 7. This capacitance is taken out by the aforementioned wires 17 to 20. These wires 17 to 20 may alternatively be replaced by other conductive means.

As shown in FIGS. 5 and 6, the housing 2 is arranged on the surface 3 whose inclination angle is to be measured. Referring to FIG. 5, the surface 3 extends in the horizontal direction. Referring to FIG. 6, on the other hand, the surface 3 is inclined with respect to a horizontal plane 22 at an angle θ. According to this embodiment, the capacitance is minimized when the surface 3 is in a horizontal state as shown in FIG. 5, while the same is maximized when the surface 3 is inclined as shown in FIG. 6.

Referring to FIG. 5, the capacitance is minimized when the left side of the rotatable electrode 7 is aligned with that of the second fixed split electrode member 13. While a small capacitance is formed between the first and second fixed split electrode members 12 and 13, this capacitance is substantially ignorable. When the surface 3 is inclined and the fixed electrode 4 is also inclined in response thereto as shown in FIG. 6, on the other hand, the rotatable electrode 7 still faces the gravitational direction regardless of such inclination, whereby the parting line 14 between the first and second fixed split electrode members 12 and 13 is brought into a positional relation of overlapping with the center line of the rotatable electrode 7. In this state, the capacitance as obtained is maximized. The inclination angle θ of the surface 3 corresponds to α/2 in this state. When the inclination angle θ is further increased from the state shown in FIG. 6, the capacitance is reduced to the contrary. Thus, the limit in measurement of the inclination angle θ is α/2.

In order to effectively utilize the respective areas of the fixed electrode 4 and the rotatable electrode 7 for providing the maximum capacitance, it is preferable that an angle half the central angle α of the rotatable electrode 7 is equal to the central angle β1 of the first fixed split electrode member 12, i.e., the following equation holds:

$$(1/2)\alpha = \beta 1 \quad (1)$$

In order to effectively utilize the respective areas of the fixed electrode 4 and the rotatable electrode 7 for providing the minimum capacitance, on the other hand, it is preferable that the central angle α of the rotatable electrode 7 is equal to the central angle β2 of the second fixed split electrode member 13, i.e., the following equation holds:

$$\alpha = \beta 2 \quad (2)$$

Hence, the respective areas of the fixed electrode 4 and the rotatable electrode 7 can be effectively utilized for providing the minimum and maximum capacitances when the following equation holds from the above equations (1) and (2):

$$\alpha = (2/3)\beta$$

In the embodiment shown in the drawings, the central angles are set as follows:

α=120°
β=180°
β1=60°
β2=120°

When the small clearance between the first and second fixed split electrode members 12 and 13 is taken into consideration as hereinabove described, the central angles α, β1 and β2 are set at values which are slightly smaller than the aforementioned specific angles.

The aforementioned specific angles of α, β, β1 and β2 are selected in order to effectively utilize the respective areas of the fixed electrode 4 and the rotatable electrode 7. These values are mere examples and not restrictive.

When the central angles α, β, β1 and β2 are selected at 120°, 180°, 60° and 120° respectively and the surface 3 is at the inclination angle θ, the total capacitance C formed by the fixed electrode 4 and the rotatable electrode 7 is expressed in the following equation (3):

$$C = (C1 \times C2)/(C1+C2) \quad (3)$$

where C1 represents the capacitance formed by the first fixed split electrode member 12 and the rotatable electrode 7, and C2 represents that formed by the second fixed split electrode member 13 and the rotatable electrode 7. Assuming that d represents the distance between the fixed electrode 4 and the rotatable electrode 7, S represents the area of the rotatable electrode 7, and e represents the dielectric constant of a medium (typically air) existing between the fixed electrode 4 and the rotatable electrode 7, the capacitances C1 and C2 are expressed in the following equations (4) and (5) respectively:

$$C1 = (e/d) \times (\theta/120) \times S \quad (4)$$

$$C2 = (e/d) \times \{(120-\theta)/120\} \times S \quad (5)$$

When the equations (4) and (5) are substituted into the equation (3), therefore, the following equation (6) is obtained:

$$C = \theta(120-\theta)(eS/120d)^2 \quad (6)$$

Figure 4:
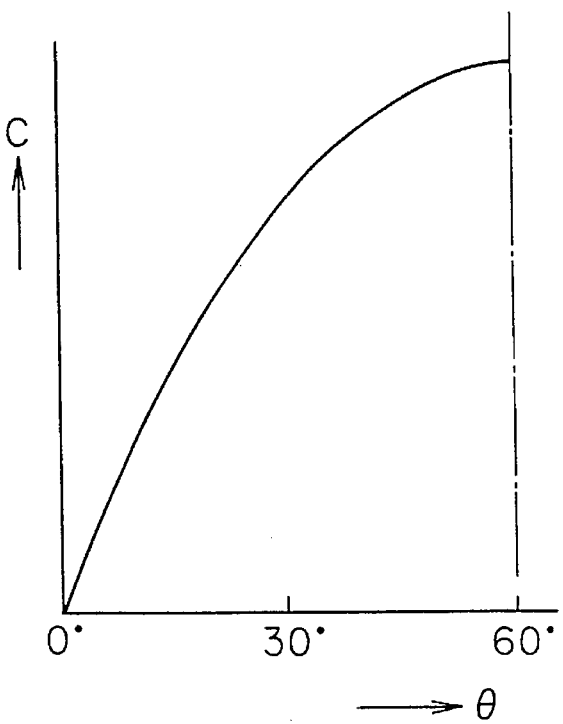
FIG. 4 illustrates the relation between an inclination angle (8) and a capacitance (C) provided by the inclination angle sensor shown in FIG. 1.

FIG. 4 shows the relation between the inclination angle θ and the capacitance C obtained on the basis of the equation (6). As shown in FIG. 4, a specific correlation is present between the inclination angle θ and the capacitance C, such that the capacitance C is maximized when the inclination angle θ is 60°. As understood from FIG. 4, it is possible to specify the inclination angle θ from the capacitance C as obtained when the inclination angle θ is in a range of 0° to 60°.

While the above description has been made with reference to the capacitance which is formed by the first fixed electrode 4 and the rotatable electrode 7, a similar capacitance is also formed by the second fixed electrode 5 and the rotatable electrode 7, so that the total of these capacitances is supplied as an input to the conversion means 21 shown in FIG. 3.

While the gravitational force of the rotatable electrode 7 itself is employed in order to make the rotatable electrode 7 face a constant direction with respect to the gravitational direction in the aforementioned embodiment, another weight may be provided on an eccentric position of the shaft 8, for example, in addition to or in place of such a structure.

What is claimed is:

1. An inclination angle sensor comprising:

a housing;

a fixed electrode fixed on said housing; and a rotatable electrode rotatably supported in said housing, at a prescribed spacing with respect to said fixed electrode, so as to be rotatable about a prescribed rotation axis and to face a constant direction with respect to the direction of gravity, said fixed electrode comprising first and second fixed split electrode members being defined by a split through said fixed electrode along a parting line radially extending from said rotation axis of said rotatable electrode and formed so that said first and second fixed split electrode members do not conduct electrically with each other, said first and second central angles of respective first and second fixed split electrode members are different from each other, said first and second fixed split electrode members respectively defining first and second central angles and together defining a total central angle of not more than 180°, said rotatable electrode defining a third central angle being not more than the total central angle of said first and second fixed split electrode members, and conductors being electrically connected with respective ones of said first and second fixed split electrode members for carrying a capacitance formed between said fixed electrode means and said rotatable electrode means.

2. An inclination angle sensor in accordance with claim 1, wherein said first and second central angles of respective said first and second fixed split electrode members are at a ratio of 1:2.

3. An inclination angle sensor in accordance with claim 1, wherein said third central angle of said rotatable electrode is ⅔ said total central angle of said first and second fixed split electrode members.

4. An inclination angle sensor in accordance with claim 1, wherein said third central angle of said rotatable electrode is twice a smaller of said first and second central angles of said first and second fixed split electrode members.

5. An inclination angle sensor in accordance with claim 1, wherein said first central angle of said first fixed split electrode member is half said third central angle of said rotatable electrode, said second central angle of said second fixed split electrode member being equal to said third central angle of said rotatable electrode.

6. An inclination angle sensor in accordance with claim 1, wherein said first and second fixed split electrode members and said rotatable electrode are substantially in the form of sectors.

7. An inclination angle sensor in accordance with claim 1, wherein said housing is conductive.

8. An inclination angle sensor in accordance with claim 1, further comprising bearings for rotatably supporting said rotatable electrode means in said housing.

9. An inclination angle sensor in accordance with claim 8, wherein said bearings include pivot bearings.

10. An inclination angle sensor in accordance with claim 1, wherein the rotatable electrode faces said constant direction with respect to the gravitational direction in response to the weight of said rotatable electrode.

11. An inclination angle sensor in accordance with claim 10, wherein the rotatable electrode faces said constant direction in response substantially only to said weight.

12. An inclination angle sensor in accordance with claim 1, further comprising a second fixed electrode being substantially identical in structure to said fixed electrode, said rotatable electrode means being positioned between said first and second fixed electrode.

13. An inclination angle sensor in accordance with claim 12, wherein said first fixed split electrode members of said first fixed electrode and second fixed split electrode members of said second fixed electrode are electrically connected with each other respectively.

14. An inclination angle sensor in accordance with claim 12, wherein the rotatable electrodes faces said constant direction with respect to the gravitational direction in response to the weight of said rotatable electrode.

15. An inclination angle sensor in accordance with claim 14, wherein the rotatable electrode faces said constant direction in response substantially only to said weight.

16. An inclination angle sensor in accordance with claim 12, wherein said rotatable electrode is electrically insulated from said housing, said fixed electrodes, and said conductors.

17. An inclination angle sensor in accordance with claim 12, wherein said prescribed spacing is provided by an air gap between said rotatable electrode and each said fixed electrode.

18. An inclination angle sensor in accordance with claim 1, wherein said rotatable electrode is electrically insulated from said housing, said fixed electrode, and said conductors.

19. An inclination angle sensor in accordance with claim 1, wherein said prescribed spacing is provided by an air gap between said rotatable electrode and said fixed electrode.

20. An apparatus for detecting an angle of inclination comprising:

a tiltable housing;

a fixed electrode mounted in the housing comprising first and second split members which are electrically isolated each from the other;

said first and second central angles of respective first and second fixed split electrode members are different from each other;

said first and second fixed split electrode members respectively defining first and second central angles and together defining a total central angle of not more than 180;

a rotatable electrode hanging adjacent and parallel to the fixed electrode and defining a prescribed gap between the fixed electrode and the rotatable electrode;

a mount provided in the housing on which the rotatable electrode is supported so as to produce an area of overlap between the rotatable electrode and the fixed electrode; and the rotatable electrode being movable to face a constant direction with respect to the direction of gravity;

a capacitance being formed between the first split member and the rotatable electrode, and between the rotatable electrode and the second split member, which capacitance varies with respect to the area of overlap between the fixed electrode and the rotatable electrode in response to rotation of the rotatable electrode with respect to the fixed electrode upon tilting of the housing.

21. The apparatus of claim 20, wherein the housing is made of a conductive material.

22. The apparatus of claim 20, wherein the rotatable electrode faces said constant direction in response substantially only to said weight.

23. The apparatus of claim 20, wherein said rotatable electrode is electrically insulated from said housing, said fixed electrode, and said mount.

* * * * *